United States Patent
Nagai

(10) Patent No.: US 12,488,450 B2
(45) Date of Patent: Dec. 2, 2025

(54) IMAGE CAPTURE CONDITION ADJUSTMENT DEVICE, IMAGE CAPTURE CONDITION ADJUSTMENT METHOD, AND PROGRAM

(71) Applicant: Konica Minolta, Inc., Tokyo (JP)

(72) Inventor: Yoshiroh Nagai, Nishinomiya (JP)

(73) Assignee: Konica Minolta, Inc., Tokyo (JP)

( * ) Notice: Subject to any disclaimer, the term of this patent is extended or adjusted under 35 U.S.C. 154(b) by 81 days.

(21) Appl. No.: 18/578,203

(22) PCT Filed: Jul. 8, 2022

(86) PCT No.: PCT/JP2022/027090
§ 371 (c)(1),
(2) Date: Jan. 10, 2024

(87) PCT Pub. No.: WO2023/008146
PCT Pub. Date: Feb. 2, 2023

(65) Prior Publication Data
US 2025/0252546 A1    Aug. 7, 2025

(30) Foreign Application Priority Data

Jul. 27, 2021 (JP) .................. 2021-122664

(51) Int. Cl.
*G01N 21/86* (2006.01)
*G06T 5/40* (2006.01)
(Continued)

(52) U.S. Cl.
CPC .............. *G06T 7/0004* (2013.01); *G06T 5/40* (2013.01); *G06T 5/50* (2013.01); *G06T 5/92* (2024.01);
(Continued)

(58) Field of Classification Search
CPC .............................. G06T 7/0004; G06T 5/40; G06T 5/50; G06T 5/92; G06T 11/001;
(Continued)

(56) References Cited

U.S. PATENT DOCUMENTS 5,477,268 A * 12/1995 Shimbara .......... G05B 19/4182
348/125
5,625,197 A * 4/1997 Shimbara .............. G06T 7/0004
250/559.22

(Continued)

FOREIGN PATENT DOCUMENTS

JP          5-164703 A     6/1993
JP       2005-024271 A     1/2005
(Continued)

OTHER PUBLICATIONS

Extended European Search Report (EESR) dated Oct. 17, 2024 issued in European patent application No. 22849211.2.

(Continued)

*Primary Examiner* — Howard D Brown, Jr.
(74) *Attorney, Agent, or Firm* — RANKIN, HILL & CLARK LLP

(57) ABSTRACT

An image capture condition adjustment device (3) includes an acquisition means (31) that acquires a plurality of captured images obtained by capturing a workpiece (100) illuminated by an illumination device (1) with a camera (2) while moving at least one of the illumination device or the camera relative to the workpiece, and an adjustment means (36) that adjusts an image capture condition for the camera (2) in such a manner that distribution of brightness of an image is uniform for each of the plurality of captured images acquired.

21 Claims, 8 Drawing Sheets

(51) Int. Cl.
 G06T 5/50 (2006.01)
 G06T 5/92 (2024.01)
 G06T 7/00 (2017.01)
 G06T 11/00 (2006.01)
 H04N 23/71 (2023.01)
 H04N 23/72 (2023.01)
 H04N 23/73 (2023.01)
 H04N 23/74 (2023.01)
 H04N 23/76 (2023.01)
(52) U.S. Cl.
 CPC .......... *G06T 11/001* (2013.01); *H04N 23/71* (2023.01); *H04N 23/72* (2023.01); *H04N 23/73* (2023.01); *H04N 23/74* (2023.01); *H04N 23/76* (2023.01); *G06T 2207/10024* (2013.01); *G06T 2207/30164* (2013.01)
(58) Field of Classification Search
 CPC .......... G06T 2207/10024; G06T 2207/30164; H04N 23/71; H04N 23/72; H04N 23/73; H04N 23/74; H04N 23/76
 See application file for complete search history.

(56) References Cited

U.S. PATENT DOCUMENTS

| | | | | |
|---|---|---|---|---|
| 6,320,654 | B1* | 11/2001 | Alders | G01N 21/8806 356/237.2 |
| 2003/0139836 | A1* | 7/2003 | Matthews | G01N 21/8806 700/109 |
| 2016/0140703 | A1* | 5/2016 | Kim | G06T 7/001 382/104 |
| 2019/0265172 | A1 | 8/2019 | Koseki et al. | |
| 2020/0011808 | A1* | 1/2020 | Ozim | G01B 11/2522 |
| 2024/0005473 | A1* | 1/2024 | Sashida | G01N 21/8806 |
| 2024/0289938 | A1* | 8/2024 | Nagai | G06T 7/0004 |
| 2024/0328962 | A1* | 10/2024 | Yoshida | G01N 21/94 |

FOREIGN PATENT DOCUMENTS

| | | |
|---|---|---|
| JP | 2009-281835 A | 12/2009 |
| JP | 2011-237302 A | 11/2011 |
| WO | 2018/088552 A1 | 5/2018 |

OTHER PUBLICATIONS

Shao Shuai et al: "Compressor Blade Fault Diagnosis Based on Image Processing", 2018 IEEE 4th International Conference On Control Science and Systems Engineering (ICCSSE), IEEE, Aug. 21, 2018 (Aug. 21, 2018), pp. 467-471; Cited in EESR.

International Search Report (ISR) dated Sep. 6, 2022 filed in PCT/JP2022/027090.

PCT Written Opinion dated Sep. 6, 2022 filed in PCT/JP2022/027090.

* cited by examiner

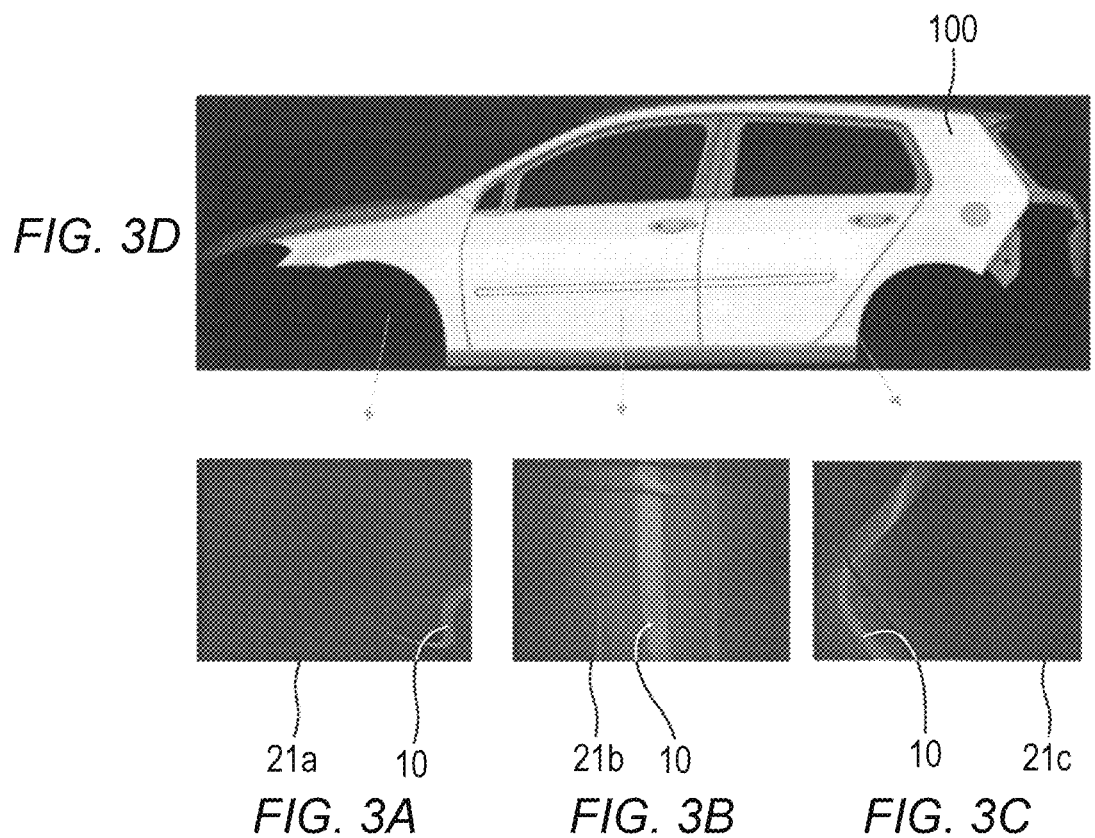
FIG. 3D
FIG. 3A  FIG. 3B  FIG. 3C
FIG. 4A  FIG. 4B  FIG. 4C
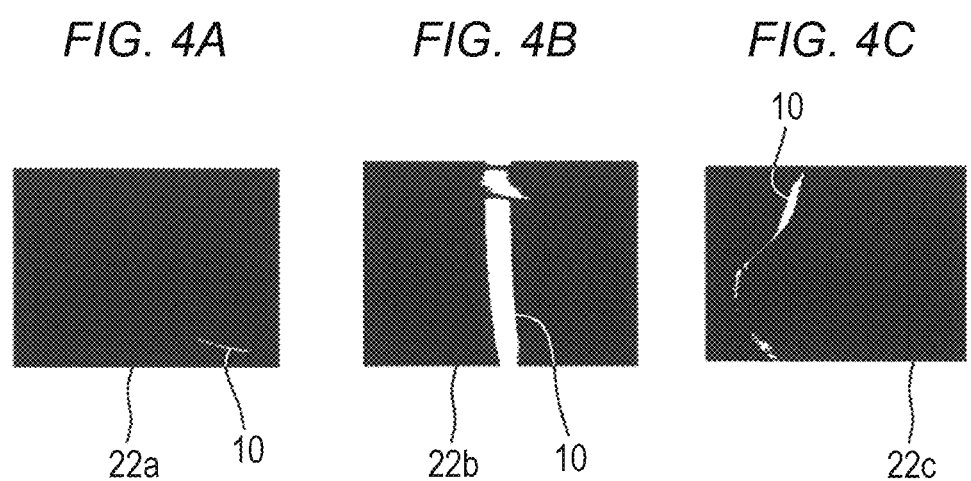

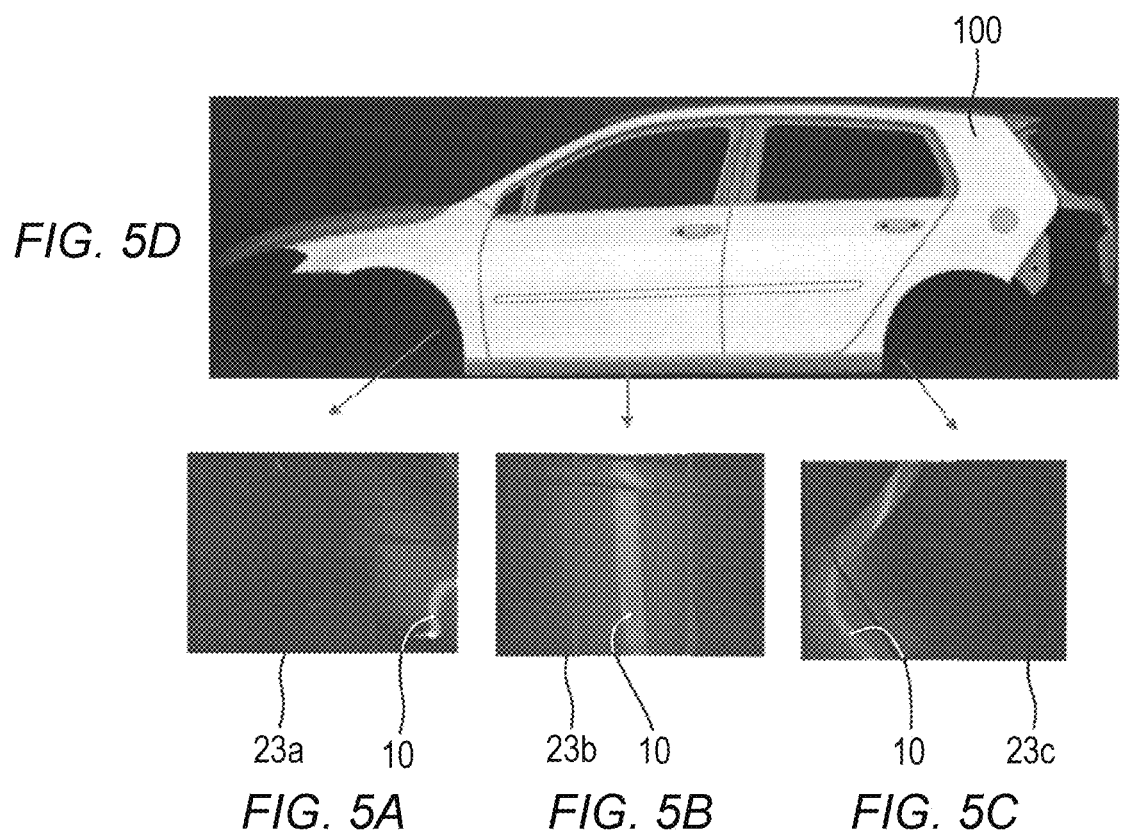
FIG. 5D
FIG. 5A   FIG. 5B   FIG. 5C
FIG. 6A   FIG. 6B   FIG. 6C
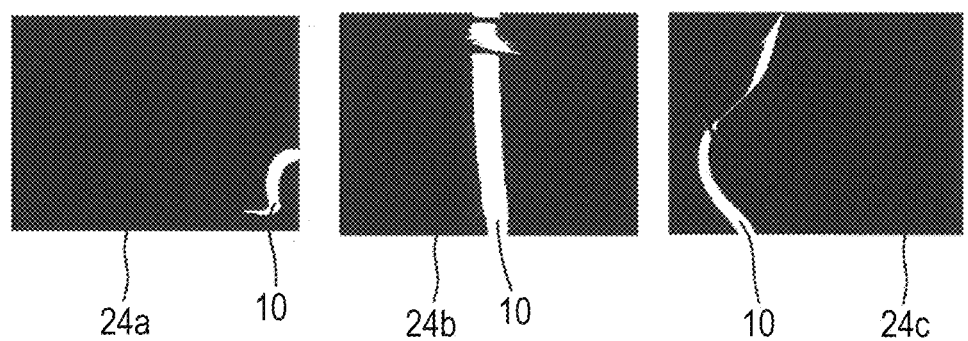

VALUE: LARGE

VALUE: SMALL

VALUE: LARGE

VALUE: SMALL

DARK AREA   LIGHT BAND   Pixel Value

FIG. 16
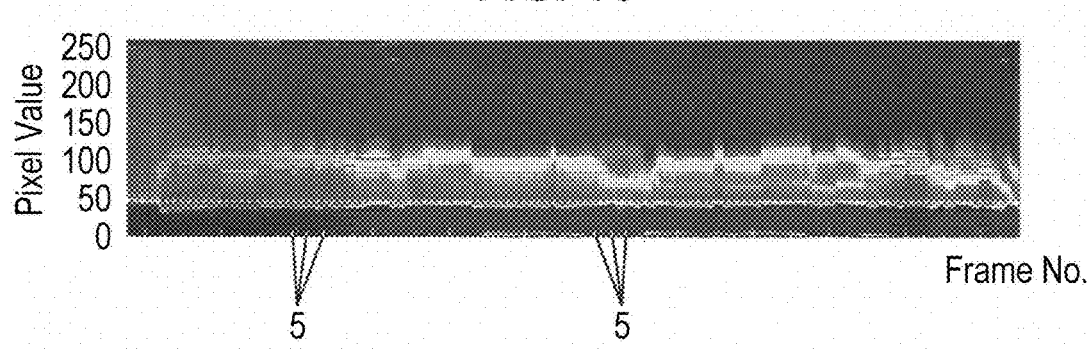
FIG. 17A    FIG. 17B
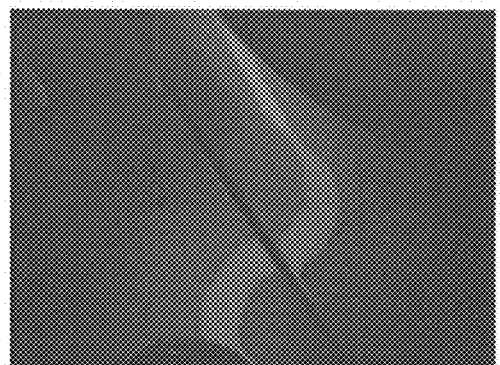    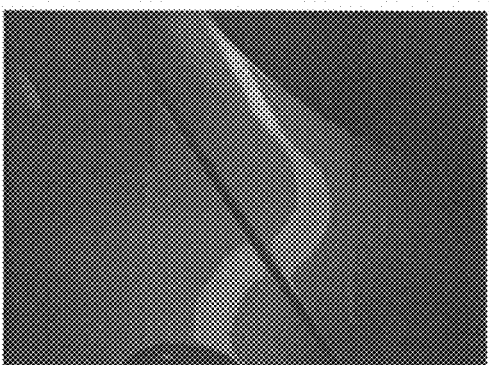
FIG. 18
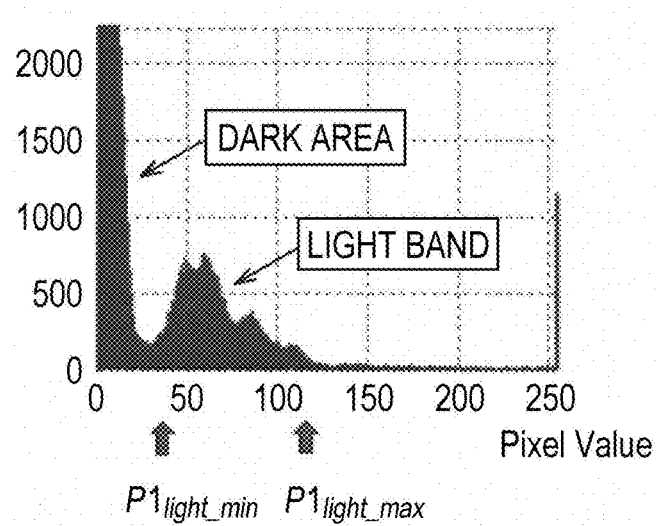

IMAGE CAPTURE CONDITION ADJUSTMENT DEVICE, IMAGE CAPTURE CONDITION ADJUSTMENT METHOD, AND PROGRAM

TECHNICAL FIELD

The present invention relates to an image capture condition adjustment device, an image capture condition adjustment method, and a program for adjusting image capture conditions of a plurality of captured images obtained by capturing a workpiece illuminated by an illumination device with a camera while moving at least one of the illumination device or the camera relative to the workpiece such as a vehicle body.

BACKGROUND ART

For example, there is known a technique of inspecting a surface defect or the like of a workpiece by capturing the workpiece illuminated by an illumination device with a camera while moving at least one of the illumination device or the camera relative to the workpiece such as a vehicle body.

In this case, about 1,000 images are captured. Since the vehicle body has a complicated three-dimensional shape, the distribution of the brightness of the image changes little by little every time the image is captured. Therefore, it is required to optimize image capture conditions for each image capture.

In order to check the effect of optimizing the image capture conditions, it is effective to check the binarized image of the result of image processing for each captured image.

Patent Literature 1 describes that the histogram of each image is created, and the average luminance value of two peaks corresponding to a bright portion and a dark portion is used as a threshold of a binarization level.

In addition, Patent Literature 2 discloses that the exposure time is controlled based on the characteristic information of a substrate, and Patent Literature 3 discloses that the exposure time is controlled based on the reflectance of an object to capture an image.

CITATION LIST

Patent Literature

Patent Literature 1: JP 05-164703 A
Patent Literature 2: JP 2009-281835 A
Patent Literature 3: JP 2005-24271 A

SUMMARY OF INVENTION

Technical Problem

However, in the technique described in Patent Literature 1, it is necessary to check a binarized image for each image. Therefore, it is difficult to check a binarized image for each of about 1,000 images as in a defect inspection of a vehicle body.

In addition, in Patent Literatures 2 and 3, the object to be measured is uniform like a substrate, does not have a three-dimensional shape like a vehicle body, and one image of the substrate is only required to be captured. Therefore, it is only required to set one exposure time for each substrate, and the verification thereof is easy. However, in a case where an image of a vehicle body with a complicated shape or the like is captured, the optimum value of the image capture condition gradually changes every time the image is captured. As a result, the techniques of Patent Literatures 2 and 3 cannot be applied.

The present invention has been made in view of such a technical background, and an object thereof is to provide an image capture condition adjustment device, an image capture condition adjustment method, and a program that eliminate the need to check a binarized image for each of a plurality of captured images in a case where a workpiece illuminated by an illumination device is captured with a camera while moving at least one of the illumination device or the camera relative to the workpiece such as a vehicle body.

Solution to Problem

The above object is achieved by the following means.

(1) An image capture condition adjustment device including:
  an acquisition means that acquires a plurality of captured images obtained by capturing a workpiece illuminated by an illumination device with a camera while moving at least one of the illumination device or the camera relative to the workpiece; and
  an adjustment means that adjusts an image capture condition for the camera in such a manner that distribution of brightness of an image is uniform for each of the plurality of captured images acquired by the acquisition means.

(2) The image capture condition adjustment device according to (1), wherein the image capture condition includes an exposure time of the camera.

(3) The image capture condition adjustment device according to (1), wherein the image capture condition includes a gain of the camera.

(4) The image capture condition adjustment device according to any one of (1) to (3), wherein the adjustment means adjusts the image capture condition in such a manner that a maximum light amount of a dark area in a captured image is a constant value, that a minimum light amount of a light band is a constant value, or that an intermediate light amount between the maximum light amount of the dark area and the minimum light amount of the light band is a constant value.

(5) The image capture condition adjustment device according to any one of (1) to (4), wherein the adjustment means adjusts the image capture condition in such a manner that a maximum light amount of a light band in a captured image does not exceed an upper limit value.

(6) The image capture condition adjustment device according to any one of (1) to (5), further including:
  a creation means that creates, for each of a plurality of captured images captured under at least one of an image capture condition before the image capture condition is adjusted or an image capture condition after the image capture condition is adjusted and acquired by the acquisition means, each of a plurality of one-dimensional histograms in which a frequency of a histogram indicating distribution of brightness of a captured image is one-dimensionally displayed in a direction of a class of the histogram by a parameter that can distinguishably represent a magnitude of the frequency; and an output means that outputs display data so as to arrange and display a plurality of one-dimensional histograms created by the creation means.

(7) The image capture condition adjustment device according to (6), wherein the parameter is color coding.

(8) The image capture condition adjustment device according to (6), wherein the parameter is gradation.

(9) The image capture condition adjustment device according to any one of (6) to (8), wherein the display data is display data in which the one-dimensional histograms are arranged and displayed densely.

(10) The image capture condition adjustment device according to any one of (6) to (8), wherein the display data is display data in which a thinned one-dimensional histogram is arranged and displayed.

(11) The image capture condition adjustment device according to (10), wherein as an image capture condition in a thinned frame, an image capture condition obtained in used frames before and after the thinned frame is used.

(12) An image capture condition adjustment method including:

an acquisition step of acquiring a plurality of captured images obtained by capturing a workpiece illuminated by an illumination device with a camera while moving at least one of the illumination device or the camera relative to the workpiece; and an adjustment step of adjusting an image capture condition for the camera in such a manner that distribution of brightness of an image is uniform for each of the plurality of captured images acquired in the acquisition step.

(13) The image capture condition adjustment method according to (12), wherein the image capture condition includes an exposure time of the camera.

(14) The image capture condition adjustment method according to (12), wherein the image capture condition includes a gain of the camera.

(15) The image capture condition adjustment method according to any one of (12) to (14), wherein in the adjustment step, the image capture condition is adjusted in such a manner that a maximum light amount of a dark area in a captured image is a constant value, that a minimum light amount of a light band is a constant value, or that an intermediate light amount between the maximum light amount of the dark area and the minimum light amount of the light band is a constant value.

(16) The image capture condition adjustment method according to any one of (12) to (15), wherein in the adjustment step, the image capture condition is adjusted in such a manner that a maximum light amount of a light band in a captured image does not exceed an upper limit value.

(17) The image capture condition adjustment method according to any one of (12) to (16), further including:

a creation step of creating, for each of a plurality of captured images captured under at least one of an image capture condition before the image capture condition is adjusted or an image capture condition after the image capture condition is adjusted and acquired in the acquisition step, each of a plurality of one-dimensional histograms in which a frequency of a histogram indicating distribution of brightness of a captured image is one-dimensionally displayed in a direction of a class of the histogram by a parameter that can distinguishably represent a magnitude of the frequency; and an output step of outputting display data so as to arrange and display a plurality of one-dimensional histograms created in the creation step.

(18) The image capture condition adjustment method according to (17), wherein the parameter is color coding.

(19) The image capture condition adjustment method according to (17), wherein the parameter is gradation.

(20) The image capture condition adjustment method according to any one of (17) to (19), wherein the display data is display data in which the one-dimensional histograms are arranged and displayed.

(21) The image capture condition adjustment method according to any one of (17) to (20), wherein the display data is display data in which a one-dimensional histogram obtained by thinning an intermediate captured image is displayed.

(22) The image capture condition adjustment method according to (21), wherein as an image capture condition in a thinned frame, an image capture condition obtained in used frames before and after the thinned frame is used.

(23) A program for causing a computer to perform the image capture condition adjustment method according to any one of (12) to (22).

Advantageous Effects of Invention

According to the inventions of (1) and (12), a plurality of captured images obtained by capturing the workpiece illuminated by the illumination device with the camera while at least one of the illumination device or the camera is moved relative to the workpiece are acquired, and the image capture condition for the camera is adjusted in such a manner that the distribution of the brightness of the image is uniform for each of the plurality of captured images acquired. Therefore, the brightness does not change largely for each captured image, and it is not necessary to check a binarized image for each captured image.

According to the inventions of (2) and (13), the exposure time of the camera is adjusted in such a manner that the distribution of the brightness of the image is uniform.

According to the inventions of (3) and (14), the gain of the camera is adjusted in such a manner that the distribution of the brightness of the image is uniform.

According to the inventions of (4) and (15), the image capture condition is adjusted in such a manner that the maximum light amount of the dark area in the captured image is a constant value, that the minimum light amount of the light band is a constant value, or that the intermediate light amount between the maximum light amount of the dark area and the minimum light amount of the light band is a constant value.

According to the inventions of (5) and (16), the image capture condition is adjusted in such a manner that the maximum light amount of the light band in the captured image does not exceed the upper limit value.

According to the inventions of (6) and (17), for each of a plurality of captured images captured by the camera, each of a plurality of one-dimensional histograms in which the frequency of a histogram indicating the distribution of the brightness of the captured image is one-dimensionally displayed in the direction of the class of the histogram by a parameter that can distinguishably represent the magnitude of the frequency is created and the display data is displayed so as to arrange and display a plurality of one-dimensional histograms created. Therefore, it is possible to grasp at a glance the distribution of the brightness of the plurality of captured images from the output display data.

According to the inventions of (7) and (18), it is possible to arrange and display a plurality of one-dimensional histograms in which the frequency is displayed by color coding.

According to the inventions of (8) and (19), it is possible to arrange and display a plurality of one-dimensional histograms in which the frequency is displayed in gradation.

According to the inventions of (9) and (20), it is possible to arrange and display one-dimensional histograms of the plurality of captured images.

According to the inventions of (10) and (21), it takes time to open the images of all the frames and perform image processing, but by opening a thinned image, performing the image processing on the thinned image, and displaying the thinned image, display can be performed in a short time.

According to the inventions of (11) and (22), as the image capture condition in a thinned frame, the image capture condition obtained in used frames before and after the thinned frame is used, so that the processing of adjusting the image capture condition is simplified.

According to the invention of (23), it is possible to cause a computer to perform the processing of acquiring a plurality of captured images obtained by capturing a workpiece illuminated by an illumination device with a camera while moving at least one of the illumination device or the camera relative to the workpiece, and of adjusting an image capture condition for the camera in such a manner that distribution of brightness of an image is uniform for each of the plurality of captured images acquired.

BRIEF DESCRIPTION OF DRAWINGS

FIG. 3 illustrates the position of the vehicle body and a captured image thereof when image capture is performed under uniform exposure conditions, and FIGS. 3A to 3C illustrate captured images, and FIG. 3D illustrates an image of the vehicle body.

FIGS. 4A to 4C illustrate binarized images obtained in a case where each of the captured images illustrated in FIGS. 3A to 3C is binarized with a binarization threshold held constant.

FIGS. 5A to 5C illustrate captured images in a state where image capture conditions are adjusted, and FIG. 5D illustrates an image of the vehicle body.

FIGS. 6A to 6C illustrate binarized images individually obtained from the captured images illustrated in FIGS. 5A to 5C.

FIG. 16 is an explanatory diagram in a case where one-dimensional histograms of all captured images after the image capture conditions are adjusted are arranged and displayed in the order of image capture.

FIG. 17A illustrates an original image under a certain image capture condition, and FIG. 17B illustrates an image under another image capture condition for obtaining a histogram.

FIG. 18 is a diagram illustrating another example of a histogram of a captured image.

DESCRIPTION OF EMBODIMENTS

Hereinafter, embodiments of the present invention will be described with reference to the drawings.

Figure 1:
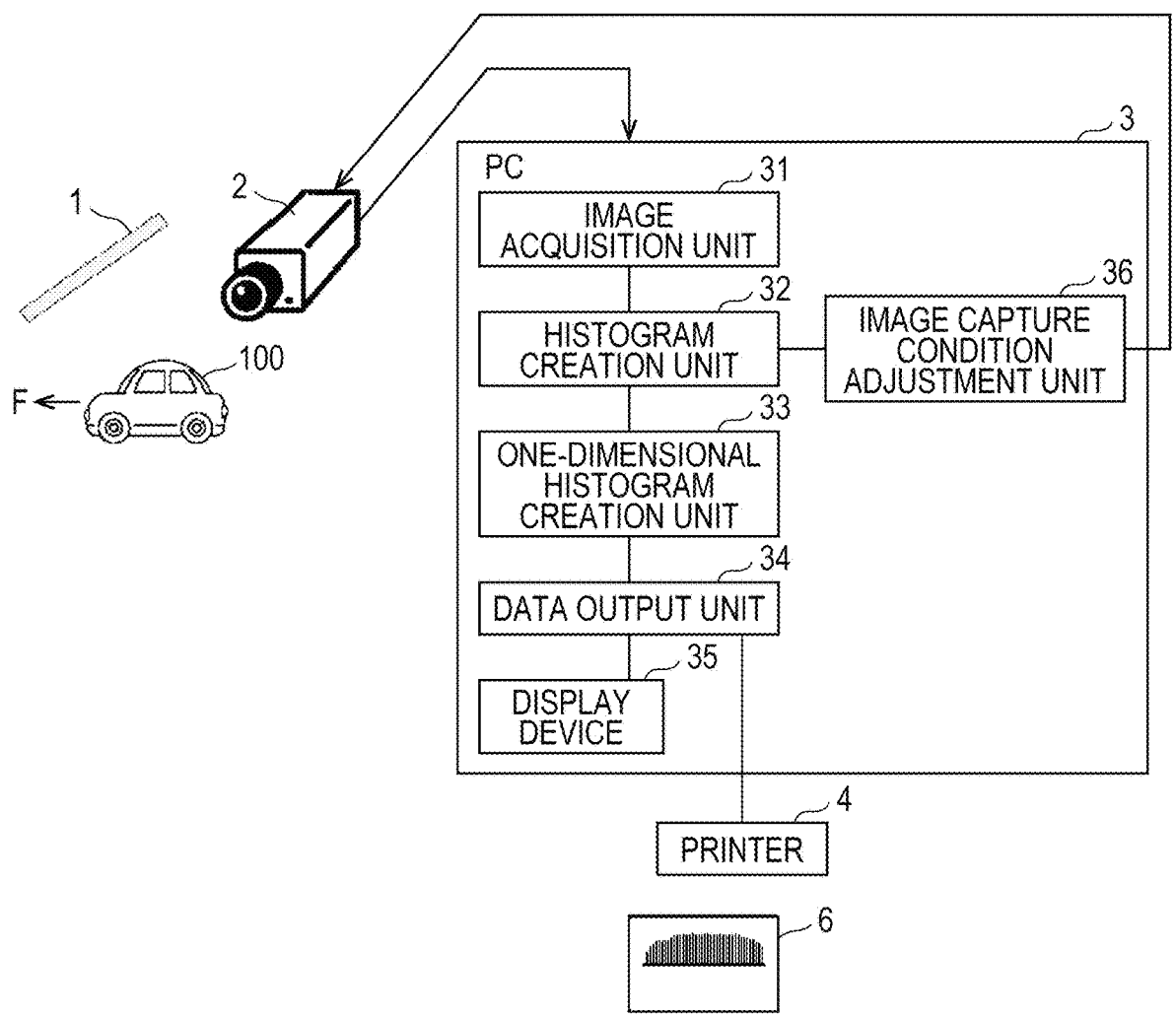
FIG. 1 is a schematic configuration diagram of an image capture system using data processing according to an embodiment of the present invention.
Figures 2A, 2B, 2C, 2D, 2E, 2F:
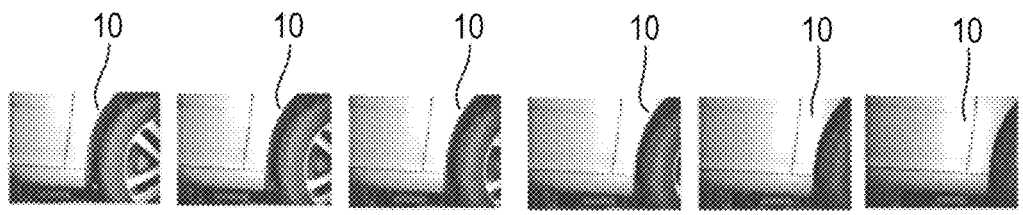
FIGS. 2A to 2F illustrate captured images when continuously captured by a camera while a vehicle body moves.

FIG. 1 is a schematic configuration diagram of an image capture system using an image capture condition adjustment device according to an embodiment of the present invention. This image capture system is a system used to inspect the presence or absence of a recessed or projecting defect on the surface of a vehicle body 100 of an automobile as a workpiece. The image capture system includes a light source 1 as an illumination device, a camera 2 including an imaging element having a large number of pixels, and a data processing device 3 as an image capture condition adjustment device that processes an image captured by the camera 2. In a state where the vehicle body 100 is illuminated with the illumination light from the light source 1, while at least one of the light source 1 or the camera 2 is moved relative to the vehicle body 100, images of a plurality of frames (for example, about 1,000) are continuously captured by the camera 2. Note that "relatively move" means that the vehicle body 100 may be moved while both the light source 1 and the camera 2 are fixed, one or both of the light source 1 and the camera 2 may be moved while the vehicle body 100 is fixed, or both of at least one of the light source 1 or the camera 2 and the vehicle body 100 may be moved with a speed difference. In this embodiment, both the light source 1 and the camera 2 are fixed, and the vehicle body 100 is moved in the direction of an arrow F.

The data processing device 3 includes a personal computer (PC) in this embodiment. The data processing device 3 operates when a processor such as a CPU operates based on an operation program stored in a storage unit (not illustrated). The data processing device 3 functionally includes an image acquisition unit 31, a histogram creation unit 32, a one-dimensional histogram creation unit 33, a data output unit 34, and an image capture condition adjustment unit 36, and further includes a display device 35 which is a display.

The image acquisition unit 31 acquires captured images continuously captured by the camera 2, the histogram creation unit 32 creates a histogram for each captured image, the one-dimensional histogram creation unit 33 creates a one-dimensional histogram, the data output unit 34 creates display data for arranging and displaying the created one-dimensional histograms and outputs the display data to the display device 35, an external printer 4, and the like, and the image capture condition adjustment unit 36 adjusts image capture conditions for the camera 2. These processing will be described later.

FIGS. 2A to 2F illustrate captured images continuously captured by the camera 2 while the vehicle body 100 moves, and these captured images are output from the camera 2 and acquired by the image acquisition unit 31 of the data processing device 3. A light band 10 of the light source 1 appearing on the vehicle body 100 while the vehicle body 100 moves is detected on the captured image, and a defect image in the light band 10 is detected. The position of the light band 10 in the captured image gradually moves along with the movement of the vehicle body 100.

Since the vehicle body 100 has a complicated three-dimensional shape, the brightness of the light band 10 appearing in the captured image differs for each captured image. For this reason, in a case where the binarized image for detecting the light band 10 is created, if the binarization threshold is constant, the light band cannot be successfully detected in the binarized image in the captured image in which the light band 10 appears dark. On the other hand, the light band 10 can be correctly detected in the binarized image in the captured image in which the light band 10 appears bright.

FIG. 3 illustrates the position of the vehicle body 100 and a captured image thereof when image capture is performed under uniform exposure conditions, and FIGS. 3A to 3C illustrate captured images, and FIG. 3D illustrates an image of the vehicle body 100.

As illustrated in FIG. 3D, a captured image 21a in FIG. 3A is a captured image of the front portion of the vehicle body 100, a captured image 21b in FIG. 3B is a captured image of the vicinity of the central portion of the vehicle body 100, and a captured image 21c in FIG. 3C is a captured image of the rear portion of the vehicle body 100. Although the light band 10 appears in any captured image, it can be seen that the brightness of the light band 10 appearing in the captured image varies depending on the image capture position of the vehicle body 100.

FIGS. 4A to 4C illustrate binarized images 22a to 22c obtained in a case where each of the captured images 21a to 21c illustrated in FIGS. 3A to 3C is binarized with a binarization threshold held constant. In a case where the light band image is dark like the captured image 21a of FIG. 3A and the captured image 21c of FIG. 3C, it can be seen that the light band 10 cannot be detected successfully like the binarized image 22a of FIG. 4A and the binarized image 22c of FIG. 4C.

If the image capture conditions of the camera 2 are adjusted for each image capture in such a manner that the brightness of the light band 10 appearing in the captured image is the same in any captured image, a binarized image can be correctly obtained from any captured image.

FIGS. 5A to 5C illustrate captured images 23a to 23c in a state where the image capture conditions are adjusted, and FIG. 5D illustrates an image of the vehicle body 100. The capture positions of the captured images 23a to 23c are the same as those in the case of FIG. 3. In this example, the exposure time is set to be long in the captured image 23a of the front side of the vehicle body 100 and the captured image 23c of the rear side of the vehicle body 100. By adjusting the exposure time for each image capture, the brightness of the light band 10 can be made uniform in any captured image. FIGS. 6A to 6C illustrate binarized images 24a to 24c individually obtained from the captured images illustrated in FIGS. 5A to 5C.

If the image capture conditions can be set in such a manner that the brightness of the light band 10 is uniform in all the captured images, a binarized image can be correctly obtained in all the captured images even if the binarization threshold is constant.

However, in the inspection target with a complicated shape such as the vehicle body 100, the distribution of the brightness of the captured image differs for each image capture, and it is not possible to grasp at a glance how the distribution of the brightness is in all the captured images. Therefore, it is very useful to grasp the distribution at a glance.

In addition, when it is possible to grasp at a glance how the distribution of the brightness of all the captured images has changed in a case where the image capture conditions are changed for each image capture, it is possible to determine at a glance whether a correct binarized image can be obtained in all the captured images.

In the present embodiment, in a case where the image capture conditions for a workpiece such as the vehicle body 100 with different brightness for each image capture are adjusted, the effect of adjustment can be grasped at a glance.

Next, the present embodiment will be specifically described.

Figure 7:
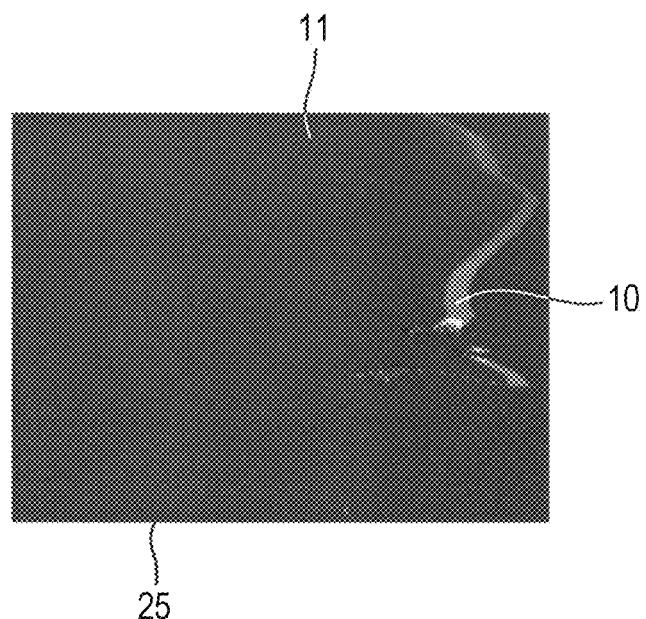
FIG. 7 illustrates one captured image captured by a camera.

FIG. 7 illustrates one captured image 25 captured by the camera 2 and acquired by the image acquisition unit 31 of the data processing device 3. A black area 11 is a dark area, and the bright striped area is the light band 10.

Figure 8:
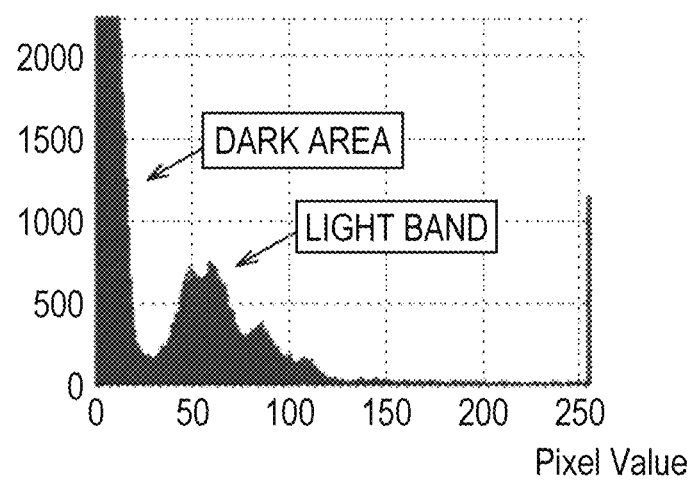
FIG. 8 is a diagram illustrating a histogram of the captured image illustrated in FIG. 7.

In general, the histogram illustrated in FIG. 8 is used to show the distribution of the brightness of the image. The horizontal axis of the histogram represents a class, and represents a pixel value of the captured image in this embodiment. The vertical axis represents a frequency, and represents the number of pixels with the pixel value in the captured image in this embodiment.

FIG. 8 is a histogram of the captured image 25 of FIG. 7 created by the histogram creation unit 32. In the histogram of FIG. 8, the mountain near a pixel value of 0 is the dark area 11, and the mountain near a pixel value of 50 is the light band 10. As understood from FIG. 8, there is a peak caused by the light band 10 in the vicinity of a pixel value of 50 in the histogram, and there is a peak caused by the dark area 11 in the vicinity of a pixel value of 0.

In the case of the histogram illustrated in FIG. 8, the distribution of the brightness of a certain captured image 25 can be seen. However, approximately 1,000 images are captured in the inspection of the surface defect of the vehicle body 100, and thus it is not possible to check the histograms of all the captured images one by one.

Therefore, the one-dimensional histogram creation unit 33 converts the histogram into a one-dimensional histogram, thereby creating the one-dimensional histogram. The conversion into the one-dimensional histogram is performed using parameters that can distinguishably represent the magnitude of frequency of the histogram indicating the distribution of brightness. In this embodiment, a case where this parameter is color coding will be described. That is, the frequency of the histogram is displayed by color coding. In the following description, displaying the frequency of the histogram by color coding is also referred to as "pseudo color display".

Figure 9:
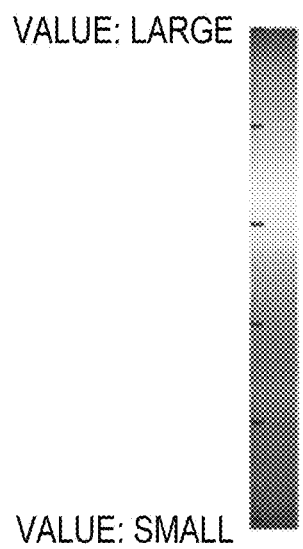
FIG. 9 is an explanatory diagram in a case where the frequency of the histogram is displayed by color coding.

As illustrated in FIG. 9, the pseudo color display is performed by performing display in a color assigned to each value magnitude, such as red in a case where the value (frequency) is large, green in a case where the value is intermediate, and blue color in a case where the value is small.

Figure 10:
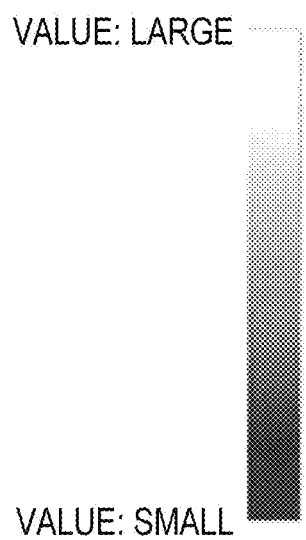
FIG. 10 is an explanatory diagram in a case where the frequency of the histogram is displayed in gradation.

Note that the parameter does not need to be color coding, and may be gradation of monochrome or the like as illustrated in FIG. 10. In this case, for example, in a case where the value (frequency) is large, light color is used, and in a case where the value is small, dark color is used, and display is performed with the density assigned to each value magnitude. In this embodiment, however, a case where the parameter is color coding will be described.

Figure 11:
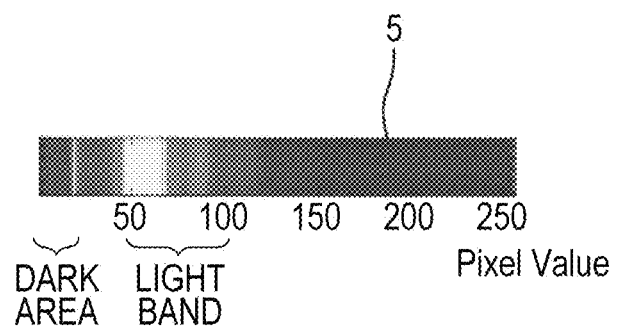
FIG. 11 is a diagram illustrating a one-dimensional histogram created by displaying the frequency of the histogram by color coding.

When the histogram illustrated in FIG. 8 is displayed in pseudo color based on the magnitude of the value (frequency), the result is as shown in FIG. 11. The horizontal axis represents a pixel value that is a class, and the parameter is displayed in the direction of the pixel value. By displaying the histogram in pseudo color, the information of the distribution of brightness, which has been displayed two-dimensionally in the histogram of FIG. 8, can be displayed one-dimensionally as in FIG. 11. In this embodiment, the histogram displayed one-dimensionally as in FIG. 11 is referred to as "one-dimensional histogram 5".

Figure 12:
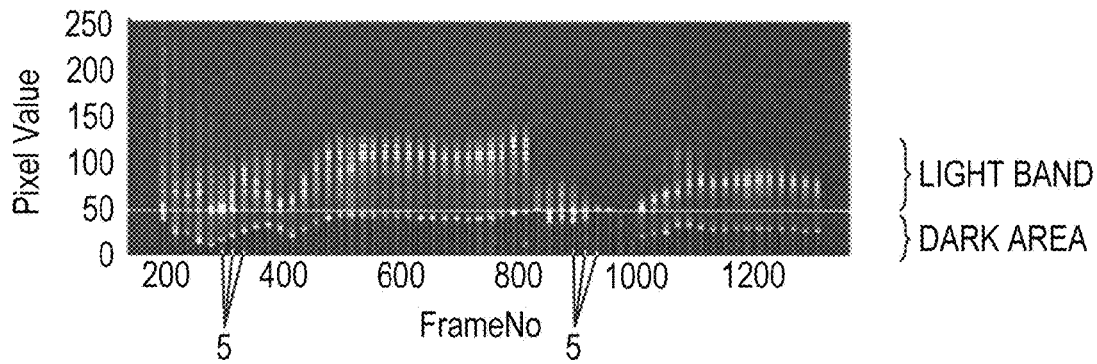
FIG. 12 is an explanatory diagram in a case where a plurality of one-dimensional histograms obtained by thinning an image are arranged and displayed.
Figure 14:
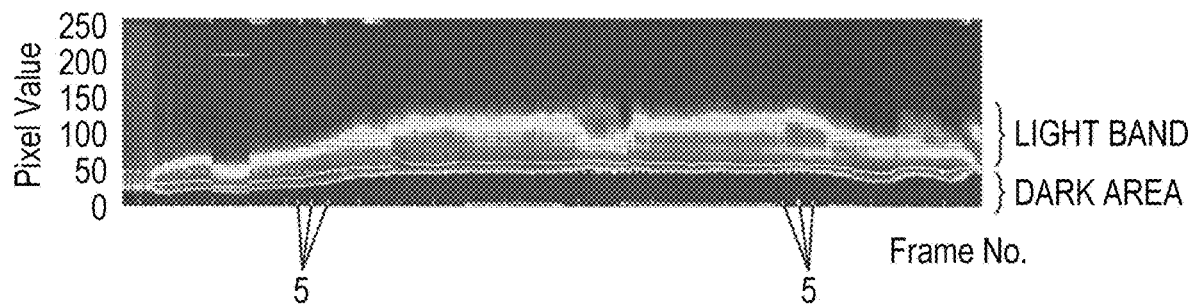
FIG. 14 is an explanatory diagram in a case where one-dimensional histograms of all captured images before the image capture conditions are adjusted are arranged and displayed.

The one-dimensional histogram 5 is created for each captured image. After the creation, when the horizontal strip-shaped one-dimensional histogram 5 is made vertical, and the one-dimensional histograms 5 are arranged in such a manner that the horizontal axis represents an image capture frame number that is the number of the captured image and the vertical axis represents a pixel value, a large number of the one-dimensional histograms 5 of captured images can be collectively displayed as illustrated in FIG. 12, 14, or 16. Note that "Frame No.", which is the name of the horizontal axis, "Pixel Value", which is the name of the vertical axis, a scale, and the like may also be displayed.

With such display, it is possible to recognize at a glance how the brightness of the light band 10 and the dark area 11 changes for each image capture frame. Note that FIGS. 14 and 16 illustrate a state where the one-dimensional histograms 5 of all the captured images are arranged and displayed densely, and FIG. 12 illustrates a state where the one-dimensional histograms 5 are arranged and displayed at intervals by regularly or irregularly thinning the one-dimensional histogram 5 of the intermediate captured image, instead of the one-dimensional histograms 5 of all the captured images. The display of FIG. 12 has an advantage that the image reading time and the image processing time can be shortened by thinning the number of frames, whereas the display of FIGS. 14 and 16 has an advantage that the brightness of all the captured images can be recognized.

The display of the one-dimensional histogram group as in FIGS. 12 and 14 may be performed by printing on a recording medium 6 such as a sheet using the printer 4 or the like in FIG. 1, and in this case, the recording medium 6 serves as a display body of the one-dimensional histogram group. Alternatively, the one-dimensional histogram group may be displayed on the screen of the display device 35, and in this case, the display device 35 serves as a display body of the one-dimensional histogram group.

In printing on the recording medium 6 and displaying on the display device 35, the display data output unit 34 creates display data in such a manner that the one-dimensional histograms 5 of all the captured images are arranged and displayed or the one-dimensional histograms 5 are displayed at intervals by thinning the one-dimensional histogram 5 of the intermediate captured image, and outputs the display data to the printer 4 or the display device 35, which is an image forming device, and the display data is printed on the recording medium 6 by the printer 4 or displayed on the display device 35. The display data may be created in a portable document format (PDF) or another file format. Note that the display data output unit 34 may transmit the display data to another display device via a network and display the display data on another display device.

Next, the processing of adjusting the image capture conditions in such a manner that the distribution of the brightness of each captured image is uniform, which is performed by the image capture condition adjustment unit 36, will be described.

Figure 13:
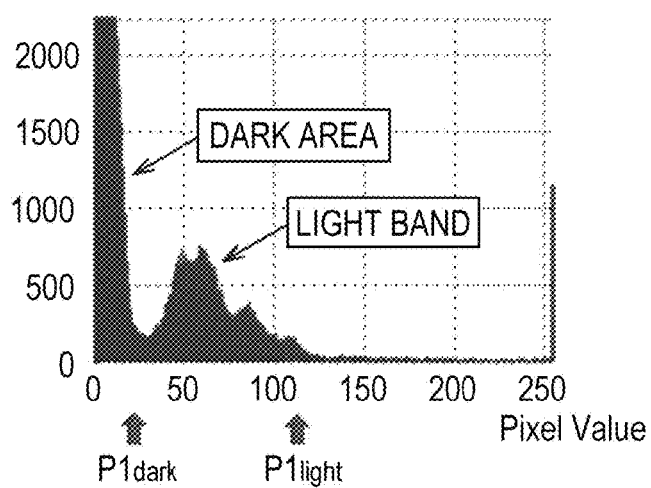
FIG. 13 is a diagram illustrating an example of a histogram of a captured image.

As illustrated in FIG. 13, assuming that the maximum pixel value of the dark area 11 is $P1_{dark}$ and the maximum pixel value of the light band 10 is $P1_{light}$ in the histogram created for each captured image, the dark area maximum pixel value $P1_{dark}(i)$ and the light band maximum pixel value $P1_{light}(i)$ in the histogram of the ith captured frame are obtained.

An output value Pixel Value of each pixel of the imaging element in the camera 2 is expressed by the following Formula (1) using an incident light amount L of the pixel, an exposure time (ExposureTime), a gain (Gain) of an amplifier circuit of a pixel signal, and a γ value (γ). In Formula (1), a is a coefficient.

[Mathematical Formula 1]

$$PixelValue = a \cdot (L \cdot Gain \cdot ExposureTime)^{\gamma} \quad (1)$$

The image capture conditions at the time of image capture by the camera 2, that is, the gain, the exposure time, and the γ value are set to (Gain1, ExposureTime1, γ1). Assuming that the pixel value at that time is P1, P1 is expressed by the following Formula (2).

[Mathematical Formula 2]

$$P1 = a \cdot (L \cdot Gain1 \cdot ExposureTime1)^{\gamma 1} \quad (2)$$

In a case where the image capture conditions are changed to (Gain2, ExposureTime2, γ2), a pixel value P2 when the same light amount L is incident on the pixel is expressed by the following Formula (3).

[Mathematical Formula 3]

[Mathematical Formula 3]

$$P2 = a \cdot (L \cdot Gain2 \cdot ExposureTime2)^{\gamma 2} \quad (3)$$

The image capture conditions (Gain2, ExposureTime2, γ2) for each image capture are obtained in such a manner that $P1_{dark}(i)$ is a constant value $P2_{dark}$ for each image capture.

The exposure time ExposureTime2 may be changed for each image capture with Gain2 held constant, or the gain Gain2 may be changed for each image capture with the exposure time ExposureTime2 held constant. Note that although the light amount L may be adjusted by adjusting the brightness of the light source 1, the adjustment is complicated, and thus it is preferable to change the exposure time ExposureTime2 or the gain Gain2.

In a case where the exposure time is changed for each image capture, the exposure time is set to ExposureTime2(i) as expressed by the following Formula (4).

[Mathematical Formula 4]

$$ExposureTime2(i) = \frac{Gain1}{Gain2} \cdot ExposureTime1 \cdot a^{\frac{1}{\gamma1}-\frac{1}{\gamma2}} \cdot \frac{(P2_{dark})^{\frac{1}{\gamma2}}}{(P1_{dark}(i))^{\frac{1}{\gamma1}}} \quad (4)$$

In a case where the gain is changed for each image capture, the gain is set to gain Gain2 (i) as expressed by Formula (5).

[Mathematical Formula 5]

$$Gain2(i) = Gain1 \cdot \frac{ExposureTime1}{ExposureTime2} \cdot a^{\frac{1}{\gamma1}-\frac{1}{\gamma2}} \cdot \frac{(P2_{dark})^{\frac{1}{\gamma2}}}{(P1_{dark}(i))^{\frac{1}{\gamma1}}} \quad (5)$$

Since more precise setting can be performed by changing the exposure time, an example in which the exposure time is changed for each image capture will be described below.

In addition, it is preferable to adjust the image capture conditions in such a manner that the light band maximum pixel value $P2_{light}$ under the new image capture conditions does not exceed a certain upper limit. The light band maximum pixel value $P2_{light}$ can be obtained from $P1_{light}$ using Formula (6) to be described later.

FIG. 14 illustrates one-dimensional histograms of all the captured images when a certain vehicle body 100 is captured by the camera 2 without adjusting image capture conditions. As can be seen from FIG. 14, unless the image capture conditions are adjusted, the brightness of each captured image is not uniform but largely varies.

Figure 15:
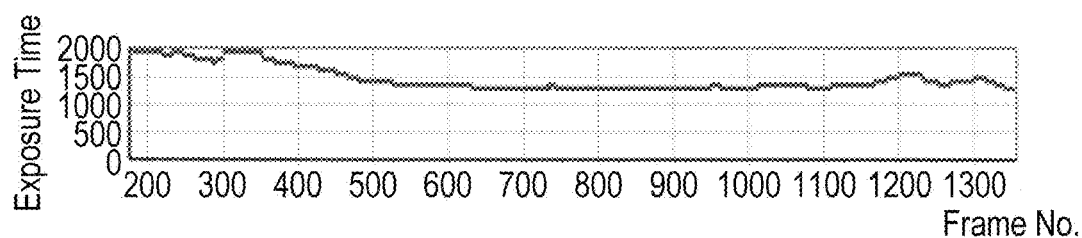
FIG. 15 is a graph illustrating an exposure time for each image capture when the exposure time is adjusted in such a manner that the distribution of the brightness of a captured image is uniform.

FIG. 15 illustrates the exposure time for each image capture obtained by Formula (4) in such a manner that $P1_{dark}(i)$ is a constant value $P2_{dark}$ for each image capture.

The pixel value P2 obtained when the image capture conditions are changed from (Gain1, ExposureTime1, γ1) to (Gain2, ExposureTime2, γ2) is calculated by Formula (6).

[Mathematical Formula 6]

$$P2 = a^{1-\frac{\gamma2}{\gamma1}} \cdot \left(\frac{Gain2 \cdot ExposureTime2}{Gain1 \cdot ExposureTime1}\right)^{\gamma2} \cdot (P1)^{\frac{\gamma2}{\gamma1}} \quad (6)$$

The one-dimensional histogram of each captured image in a case where the image capture conditions include (Gain2, ExposureTime2, γ2) is obtained using the above Formula (6), and the one-dimensional histograms of all the captured images are arranged in the order of image capture, so that FIG. 16 is obtained. It is possible to check at a glance how the distribution of the brightness of all the captured images is in a case where the image capture conditions are changed.

Note that the histogram in a case where the image capture conditions include (Gain2, ExposureTime2, γ2) may be obtained after the original image under the photographing conditions (Gain1, ExposureTime1, γ1) illustrated in FIG. 17A is converted into the image under the image capture conditions (Gain2, ExposureTime2, γ2) illustrated in FIG. 17B.

Alternatively, the histogram of an image obtained under the new exposure conditions can be obtained only by converting the value (Pixel Value) of the horizontal axis in the histogram of the original image using Formula (6).

In the distribution of the brightness illustrated in FIG. 17, the maximum light amount of the dark area 11 is constant in all the captured images, and thus it can be seen at a glance that the binarized image can be correctly calculated with the binarization threshold common to all the captured images.

In the above description, the image capture conditions (Gain2, ExposureTime2, γ2) for each image capture are obtained in such a manner that $P1_{dark}(i)$ is the constant value $P2_{dark}$ for each image capture, but the minimum light amount of the light band 10 may be controlled to be constant.

That is, as illustrated in FIG. 18, the light band minimum pixel value $P1_{light\_min}(i)$ and the light band maximum pixel value $P1_{light\_max}(i)$ of the ith frame are obtained from the histogram obtained for each image capture.

The image capture conditions (Gain2, ExposureTime2, γ2) for each image capture are obtained in such a manner that the light band minimum pixel value $P1_{light\_min}(i)$ is the constant value $P2_{light\_min}$ for each image capture.

Exposure Time2 may be changed for each frame with Gain2 held constant, or Gain2 may be changed for each image capture with ExposureTime2 held constant.

In a case where the exposure time is changed for each image capture, the exposure time is set to ExposureTime2(i) as expressed by the following Formula (7).

[Mathematical Formula 7]

$$ExposureTime2(i) = \frac{Gain1}{Gain2} \cdot ExposureTime1 \cdot a^{\frac{1}{\gamma1}-\frac{1}{\gamma2}} \cdot \frac{(P2_{light\_min})^{\frac{1}{\gamma2}}}{(P1_{light\_min}(i))^{\frac{1}{\gamma1}}} \quad (7)$$

In a case where the gain is changed for each image capture, the gain is set to gain Gain2 (i) as expressed by Formula (8).

[Mathematical Formula 8]

$$Gain2(i) = Gain1 \cdot \frac{ExposureTime1}{ExposureTime2} \cdot a^{\frac{1}{\gamma1}-\frac{1}{\gamma2}} \cdot \frac{(P2_{light\_min})^{\frac{1}{\gamma2}}}{(P1_{light\_min}(i))^{\frac{1}{\gamma1}}} \quad (8)$$

In addition, it is preferable to adjust the image capture conditions in such a manner that the light band maximum pixel value $P2_{light\_max}$ under the new image capture conditions does not exceed a certain upper limit. $P2_{light\_max}$ can be obtained from $P1_{light\_max}$ using Formula (6).

Alternatively, the intermediate value between the maximum light amount in the dark area and the minimum light amount in the light band may be controlled to be a constant value.

Figure 19:
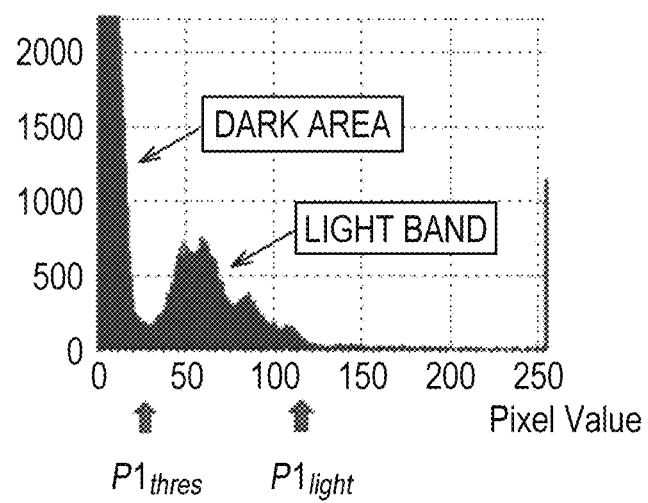
FIG. 19 is a diagram illustrating yet another example of a histogram of a captured image.

That is, as illustrated in FIG. 19, an intermediate value $P1_{thres}(i)$ between the light band minimum pixel value and the dark area maximum pixel value and the light band maximum pixel value $P1_{light}(i)$ for the ith frame are obtained.

The image capture conditions (Gain2, ExposureTime2, γ2) for each image capture are obtained in such a manner that $P1_{thres}(i)$ is a constant value $P2_{thres}$ for each image capture.

Exposure Time2 may be changed for each frame with Gain2 held constant, or Gain2 may be changed for each image capture with ExposureTime2 held constant.

In a case where the exposure time is changed for each image capture, the exposure time is set to ExposureTime2(i) as expressed by the following Formula (9).

[Mathematical Formula 9]

$$ExposureTime2(i) = \frac{Gain1}{Gain2} \cdot ExposureTime1 \cdot a^{\frac{1}{\gamma1}-\frac{1}{\gamma2}} \cdot \frac{(P2_{thres})^{\frac{1}{\gamma2}}}{(P1_{thres}(i))^{\frac{1}{\gamma1}}} \quad (9)$$

In a case where the gain is changed for each image capture, the gain is set to gain Gain2 (i) as expressed by Formula (10).

[Mathematical Formula 10]

$$Gain2(i) = Gain1 \cdot \frac{ExposureTime1}{ExposureTime2} \cdot a^{\frac{1}{\gamma1}-\frac{1}{\gamma2}} \cdot \frac{(P2_{thres})^{\frac{1}{\gamma2}}}{(P1_{thres}(i))^{\frac{1}{\gamma1}}} \quad (10)$$

In addition, it is preferable to adjust the image capture conditions in such a manner that the light band maximum pixel value $P2_{light}$ under the new image capture conditions does not exceed a certain upper limit. $P2_{light}$ can be obtained from $P1_{light}$ using Formula (6).

As described above, in the present embodiment, the distribution of the image luminance in all the captured images can be visualized by the display body in which the one-dimensional histograms 5 are arranged, and the effect of the adjustment optimization of the image capture conditions can be evaluated at a glance.

Note that, in a case where the image is thinned and processed, the values of the image capture conditions obtained in the used frames before and after the frame that is not used may be used. For example, in a case where the image capture conditions are calculated using the 1st, 6th, 11th, 16th, ... frames, the image capture conditions obtained using the 1st frame are used as the image capture conditions of the 2nd, ... 5th frames, and the image capture conditions obtained using the 6th frame are used as the image capture conditions of the 7th, ... 10th frames.

This application claims the priority of Japanese Patent Application No. 2021-122664 filed on Jul. 27, 2021, the disclosure of which is incorporated herein by reference.

INDUSTRIAL APPLICABILITY

The present invention can be used to adjust image capture conditions of a plurality of captured images obtained by capturing a workpiece illuminated by an illumination device with a camera while moving at least one of the illumination device or the camera relative to the workpiece such as a vehicle body.

REFERENCE SIGNS LIST 1 light source (illumination device)
2 camera
3 data processing device (image capture condition adjustment device)
31 image acquisition unit
32 histogram creation unit
33 one-dimensional histogram creation unit
34 data output unit
35 display device (display body)
36 image capture condition adjustment unit
4 printer
5 one-dimensional histogram
6 recording medium (display body)
10 light band
11 dark area

The invention claimed is:

1. An image capture condition adjustment device comprising
   a hardware processor that acquires a plurality of captured images obtained by capturing a workpiece illuminated by an illumination device with a camera while moving at least one of the illumination device or the camera relative to the workpiece, and
   adjusts an image capture condition for the camera in such a manner that distribution of brightness of an image is uniform for each of the plurality of captured images acquired, wherein
   the hardware processor adjusts the image capture condition in such a manner that a maximum light amount of a dark area in a captured image is a constant value, that a minimum light amount of a light band is a constant value, or that an intermediate light amount between the maximum light amount of the dark area and the minimum light amount of the light band is a constant value.

2. The image capture condition adjustment device according to claim 1, wherein the image capture condition includes an exposure time of the camera.

3. The image capture condition adjustment device according to claim 1, wherein the image capture condition includes a gain of the camera.

4. The image capture condition adjustment device according to claim 1, wherein the hardware processor adjusts the image capture condition in such a manner that a maximum light amount of a light band in a captured image does not exceed an upper limit value.

5. The image capture condition adjustment device according to claim 1, wherein
   the hardware processor creates, for each of a plurality of captured images captured under at least one of an image capture condition before the image capture condition is adjusted or an image capture condition after the image capture condition is adjusted, each of a plurality of one-dimensional histograms in which a frequency of a histogram indicating distribution of brightness of a captured image is one-dimensionally displayed in a direction of a class of the histogram by a parameter that can distinguishably represent a magnitude of the frequency, and
   outputs display data so as to arrange and display a plurality of one-dimensional histograms created.

6. The image capture condition adjustment device according to claim 5, wherein the parameter is color coding.

7. The image capture condition adjustment device according to claim 5, wherein the parameter is gradation.

8. The image capture condition adjustment device according to claim 5, wherein the display data is display data in which the one-dimensional histograms are arranged and displayed.

9. The image capture condition adjustment device according to claim 5, wherein the display data is display data in which a one-dimensional histogram obtained by thinning an intermediate captured image is displayed.

10. The image capture condition adjustment device according to claim 9, wherein as an image capture condition in a thinned frame, an image capture condition obtained in used frames before and after the thinned frame is used.

11. An image capture condition adjustment method comprising:
    acquiring a plurality of captured images obtained by capturing a workpiece illuminated by an illumination device with a camera while moving at least one of the illumination device or the camera relative to the workpiece; and adjusting an image capture condition for the camera in such a manner that distribution of brightness of an image is uniform for each of the plurality of captured images acquired in the acquiring, wherein in the adjusting, the image capture condition is adjusted in such a manner that a maximum light amount of a dark area in a captured image is a constant value, that a minimum light amount of a light band is a constant value, or that an intermediate light amount between the maximum light amount of the dark area and the minimum light amount of the light band is a constant value.

12. The image capture condition adjustment method according to claim 11, wherein the image capture condition includes an exposure time of the camera.

13. The image capture condition adjustment method according to claim 11, wherein the image capture condition includes a gain of the camera.

14. The image capture condition adjustment method according to claim 11, wherein in the adjusting, the image capture condition is adjusted in such a manner that a maximum light amount of a light band in a captured image does not exceed an upper limit value.

15. The image capture condition adjustment method according to claim 11, further comprising:

creating, for each of a plurality of captured images captured under at least one of an image capture condition before the image capture condition is adjusted or an image capture condition after the image capture condition is adjusted and acquired in the acquiring, each of a plurality of one-dimensional histograms in which a frequency of a histogram indicating distribution of brightness of a captured image is one-dimensionally displayed in a direction of a class of the histogram by a parameter that can distinguishably represent a magnitude of the frequency; and outputting display data so as to arrange and display a plurality of one-dimensional histograms created in the creating.

16. The image capture condition adjustment method according to claim 15, wherein the parameter is color coding.

17. The image capture condition adjustment method according to claim 15, wherein the parameter is gradation.

18. The image capture condition adjustment method according to claim 15, wherein the display data is display data in which the one-dimensional histograms are arranged and displayed.

19. The image capture condition adjustment method according to claim 15, wherein the display data is display data in which a one-dimensional histogram obtained by thinning an intermediate captured image is displayed.

20. The image capture condition adjustment method according to claim 19, wherein as an image capture condition in a thinned frame, an image capture condition obtained in used frames before and after the thinned frame is used.

21. A non-transitory recording medium storing a computer readable program for causing a computer to perform the image capture condition adjustment method according to claim 11.

* * * * *